(12) United States Patent
Deng et al.

(10) Patent No.: US 8,654,352 B1
(45) Date of Patent: Feb. 18, 2014

(54) CHROMATIC CONFOCAL SCANNING APPARATUS

(75) Inventors: Jiangwen Deng, Kwai Chung (HK); Zhuanyun Zhang, Kwai Chung (HK); Fang Han Chen, Kwai Chung (HK); Wui Fung Sze, Kwai Chung (HK)

(73) Assignee: ASM Technology Singapore Pte Ltd, Singapore (SG)

( * ) Notice: Subject to any disclaimer, the term of this patent is extended or adjusted under 35 U.S.C. 154(b) by 0 days.

(21) Appl. No.: 13/569,413

(22) Filed: Aug. 8, 2012

(51) Int. Cl.
*G01B 11/24* (2006.01)

(52) U.S. Cl.
CPC ............. *G01B 11/24* (2013.01)
USPC .......................... 356/601; 356/600

(58) Field of Classification Search
CPC ........................................ G01B 11/24
USPC .................................. 356/600–614
See application file for complete search history.

(56) References Cited

U.S. PATENT DOCUMENTS

| | | | | |
|---|---|---|---|---|
| 5,785,651 A | * | 7/1998 | Kuhn et al. | 600/310 |
| 6,064,756 A | | 5/2000 | Beaty et al. | |
| 2007/0241266 A1 | * | 10/2007 | Gweon et al. | 250/225 |
| 2010/0188742 A1 | | 7/2010 | Chen et al. | |
| 2010/0296106 A1 | | 11/2010 | Gates et al. | |
| 2012/0105859 A1 | * | 5/2012 | Heo et al. | 356/456 |

* cited by examiner

*Primary Examiner* — Michael P Stafira
(74) *Attorney, Agent, or Firm* — Ostrolenk Faber LLP (57) ABSTRACT

A chromatic confocal scanning apparatus comprises a light source for producing light rays comprising a plurality of wavelengths, a first screen having an open elongated slit which allows a strip of light rays produced from the light source to pass through the slit and a cylindrical objective lens both to converge the light rays onto an object surface that is to be measured, and to image light rays reflected from the object surface. An intermediate cylindrical lens set converges a strip of light rays imaged from the cylindrical objective lens to pass through an open elongated slit comprised in a second screen, and a color sensor receives light rays which have passed through the slit of the second screen for determining a plurality of wavelengths of the said strip of light rays, to thereby construct a height profile of at least a portion of the object surface.

15 Claims, 8 Drawing Sheets

CHROMATIC CONFOCAL SCANNING APPARATUS

FIELD OF THE INVENTION

The invention relates to an apparatus for inspecting a surface of an object, and in particular for determining a height profile of the surface.

BACKGROUND AND PRIOR ART

Over the past few decades, demand for semiconductor devices has grown rapidly. Semiconductor manufacturers are often pressured into improvements in end-product quality, speed and performance, as well as improvements in manufacturing process quality, speed and performance. Machine vision has proven to be a very essential part of improving the productivity and quality of semiconductor production. There is a consistent drive for faster and more accurate machine vision systems for ever-higher semiconductor yields. Many high-density semiconductor packaging inspection applications require three-dimensional measurement capability. Correspondingly, the technical field of three-dimensional measurement and inspection for semiconductor devices, such as semiconductor wafers or substrates on final packaged products, has seen rapid growth.

Many commercial systems use triangulation-based principles for three-dimensional measurement such as that disclosed in U.S. Pat. No. 6,064,756 entitled "Apparatus for Three Dimensional Inspection of Electronic Components." It describes a three dimensional inspection apparatus for a ball array device which is positioned in a fixed optical system. A first camera is disposed in a fixed focus position relative to the ball array device for taking a first image of the ball array device to obtain a characteristic circular doughnut shape image from a ball. A second camera is disposed in a fixed focus position relative to the ball array device for taking a second image of the ball array device to obtain a top surface image of the ball. A processor applies triangulation calculations on related measurements of the first image and the second image to calculate a three dimensional position of the ball with reference to a pre-calculated calibration plane.

Other triangulation-based systems may utilize focused laser or fringe pattern projection. In such triangulation approaches, a laser or other structural pattern projects light or patterns onto an object surface and a sensor is inclined with respect to the incident light or pattern. There is a drift in a position of the light or pattern detected by the sensor when the height varies. Height information can be measured from the drift position detected on the sensor. However, the triangulation setup is vulnerable to occlusion and shadows. Moreover, due to the measurement range required by semiconductor packages like Ball Grid Array (BGA) packages, its pixel/spot resolution is typically poorer than 10 µm. As such, there is insufficient optical resolution due to the required measurement range. It would be necessary to enhance the optical resolution to meet the high-accuracy demands required by the latest packaging technology.

Confocal optical devices make use of the principle that an output signal is at a peak (in intensity or contrast) at a focal plane of the confocal optical device. It utilizes a diffraction-limited spot with a large Numerical Aperture (N.A.), and thus it is capable of submicron optical resolution. It needs two scans, for instance a rotating Nipkow disk or other scanning method to scan a horizontal XY plane and vertical Z movement to scan a target depth of field given a very small depth of focus of the confocal optical system.

US Patent Publication Number 2010/0296106 A1 entitled "Chromatic Confocal Sensor" discloses a confocal optical system comprising a substrate having thereon a multiphoton curable photoreactive composition, a light source that emits a light beam comprising a plurality of wavelengths onto at least one region of the composition on the substrate, and a detector that detects a portion of light reflected from the composition to obtain a location signal with respect to the substrate, wherein the location signal is based at least on a wavelength of the reflected light. In this way, a height of an object surface can be determined.

Unfortunately, the aforesaid chromatic confocal sensor can only inspect one single dot on the object surface at any one time. Therefore, there is a need to move the sensor two-dimensionally on a horizontal plane to scan the whole object surface. As such, measurement of the whole of a three-dimensional surface is very time consuming and far from the high throughput required by the semiconductor industry.

Some slit scanning systems make use of the dispersive properties of diffractive lenses by which the image planes of a slit are wavelength dependent and are uniformly distributed along a longitudinal direction. Wavelength-coded light rays with variable foci are then imaged onto a measured sample through a coupling lens and a microscope objective lens. Specifically, US Patent Publication number 2010/0188742 entitled "Slit-Scan Multi-Wavelength Confocal Lens Module and Slit-Scan Microscopic System and Method Using the Same" discloses a slit-scan multi-wavelength confocal system which utilizes at least two lenses having chromatic aberration for splitting a broadband light into continuously linear spectral lights having different focal lengths respectively.

The aforesaid slit-scan confocal systems make use of conventional circular lenses as a microscope objective lens. Yet, owing to manufacturing difficulty, the Field of View (FOV) of commercial microscope objective lenses is very limited, especially those with large N.A. Therefore the inspection speed is also limited. Furthermore, the N.A. of a circular objective lens is symmetrical and thus any out-of-focus light emerging from the slit which is projected on the object cannot be suppressed as in a conventional spot-scan confocal system. Therefore, this will greatly affect the measurement accuracy.

SUMMARY OF THE INVENTION

Thus, the invention seeks to provide an apparatus for scanning a surface of an object that has an increased field of view ("FOV"), better energy utilization and more accurate slit-based measurement as compared to the prior art.

Accordingly, the invention provides a chromatic confocal scanning apparatus comprising: a light source for producing light rays comprising a plurality of wavelengths; a first screen having an open elongated slit which allows a strip of light rays produced from the light source to pass through the slit; a cylindrical objective lens operative to converge and project the light rays onto an object surface that is to be measured, and to image light rays reflected from the object surface; an intermediate cylindrical objective lens set operative to converge a strip of light rays imaged from the cylindrical objective lens to pass through an open elongated slit comprised in a second screen; and a color sensor configured to receive light rays which have passed through the slit of the second screen for determining a plurality of wavelengths of the said strip of light rays for constructing a height profile of at least a portion of the object surface.

It would be convenient hereinafter to describe the invention in greater detail by reference to the accompanying drawings which illustrate one preferred embodiment of the invention.

The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of the preferred embodiment of the invention when considered with the accompanying drawings, in which.

DETAILED DESCRIPTION OF THE PREFERRED EMBODIMENT OF THE INVENTION

Figure 1:
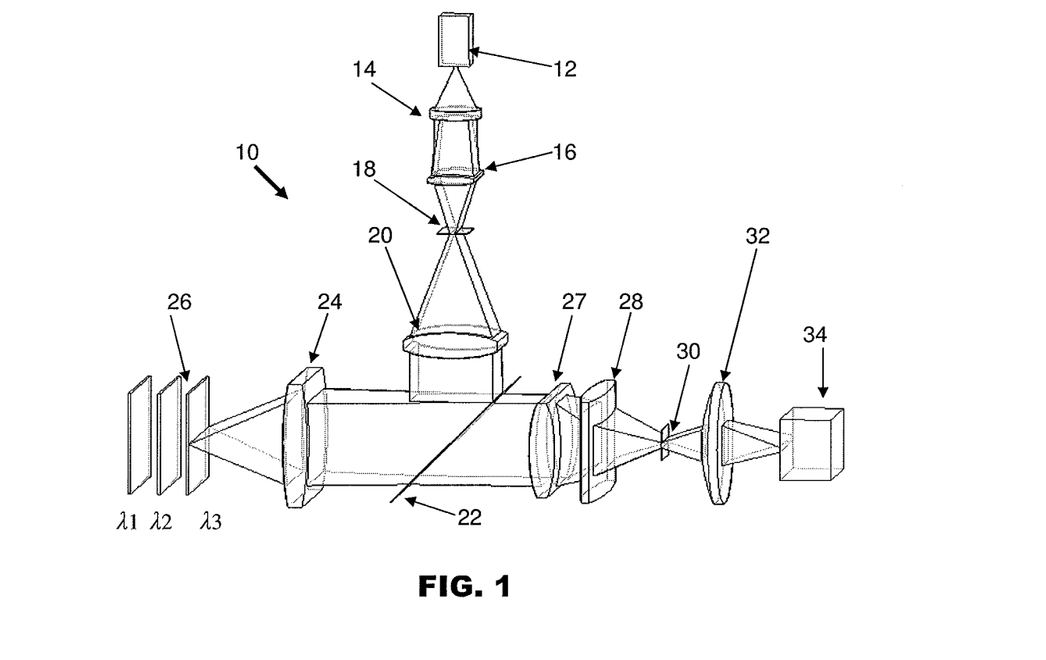
FIG. 1 is a schematic diagram showing a lens system of a chromatic confocal scanning apparatus for measuring a surface of an object according to the first preferred embodiment of the invention.

FIG. 1 is a schematic diagram showing a lens system 10 of a chromatic confocal scanning apparatus for measuring a surface 26 of an object according to the preferred embodiment of the invention. The lens system 10 comprises a light source 12 for producing light rays having multiple wavelengths for illuminating the surface. Light rays from the light source 12 comprising a plurality of wavelengths are passed through a first collimator 14 for making the light rays from the light source 12 parallel. Collimated light rays are transmitted through a cylindrical condenser 16 to a first screen with an open elongated slit 18 which allows a single strip of light rays to pass through the elongated slit 18. Thereafter, the strip of light rays is passed through an illuminating cylindrical achromatic lens 20 onto a beam splitter 22.

The beam splitter 22 directs the light rays from the light source 12 towards the surface 26 of the object to be measured. The light rays are converged and projected by a cylindrical objective lens 24 with chromatic aberration onto the surface 26 of the object, so that a portion of the surface 26 is illuminated by a strip of light. Depending on the wavelength of the light rays, the light rays will have different focal planes. Thus, according to FIG. 1, light rays with a wavelength $\lambda 1$ converge at a focal plane further away from the cylindrical objective lens 24 whereas light rays with a wavelength $\lambda 3$ converge at a focal plane that is nearer to the cylindrical objective lens 24. The different wavelengths correspond to different colors of light which are reflected from the surface 26 of the object. Hence, from the colors of the light rays that are reflected from the surface 26 of the object, the distance of each point on the surface 26 along the strip of light from the cylindrical objective lens 24 is determinable.

Light rays reflected from the surface 26 of the object pass through and are imaged by the cylindrical objective lens 24 towards the beam splitter 22 and then an intermediate cylindrical lens comprising a first achromatic lens 27. The first achromatic lens 27 converge the light rays along a first direction, and thereafter, another intermediate cylindrical lens comprising a second achromatic lens 28 is arranged such that it converges the light rays in a second direction which is orthogonal to the first direction. The light rays are arranged and configured to pass through an elongated slit 30 of a second screen. Light rays that are passed through the elongated slit 30 are imaged by an objective lens 32 before they are received by a color sensor 34, such as a spectrophotometer. The positions and colors of the light rays as determined by the color sensor 34 will allow the apparatus to construct a height profile of an elongated region on the surface 26 of the object as illuminated by the strip of light. A whole of the surface 26 comprising multiple integrated portions of the surface 26 can then be inspected by moving the strip of light linearly with respect to the surface, and combining the results obtained from successive captured images. For moving the strip of light, a positioning device may be coupled to the object in order to move the surface 26 of the object relative to the cylindrical objective lens 24.

Figure 2:
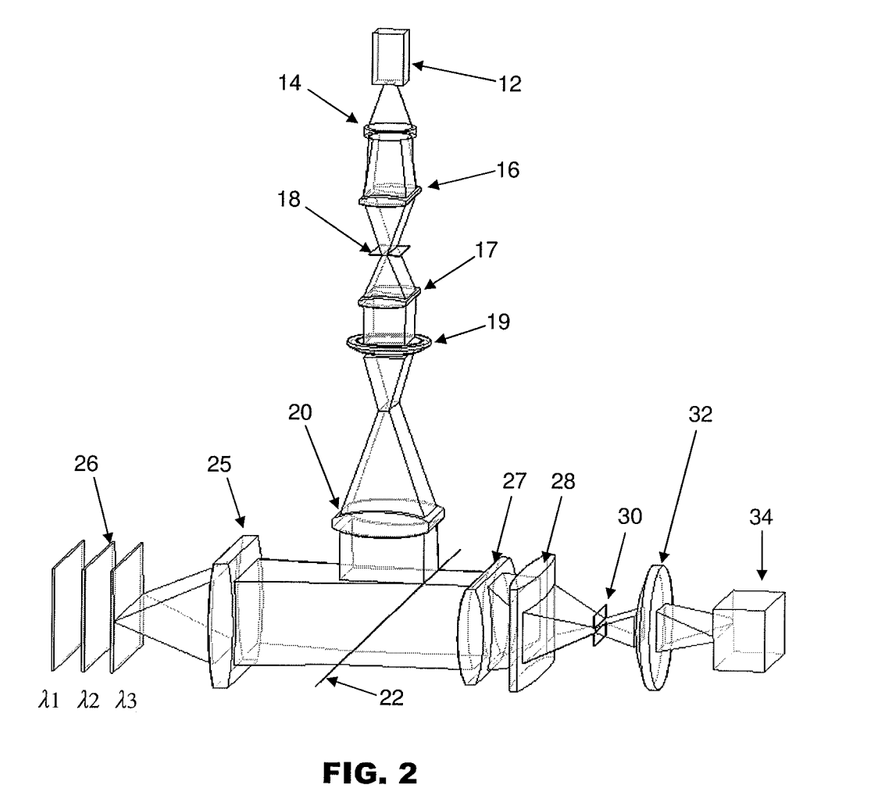
FIG. 2 is a schematic diagram showing a lens system of a chromatic confocal scanning apparatus for measuring a surface of an object according to the second preferred embodiment of the invention.

Instead of using a chromatic cylindrical objective lens as described above, other lenses which exhibit chromatic characteristics may also be adopted. FIG. 2 is a schematic diagram showing a lens system of a chromatic confocal scanning apparatus for measuring a surface of an object according to the second preferred embodiment of the invention. In this second embodiment, a cylindrical collimator 17 and a diffractive lens 19 are positioned between the open elongated slit 18 and the illuminating cylindrical achromatic lens 20. In this case, the cylindrical objective lens may comprise an achromatic cylindrical objective lens 25 instead, since the diffractive lens 19 serves the function of chromatic aberration of the light rays.

Figure 3:
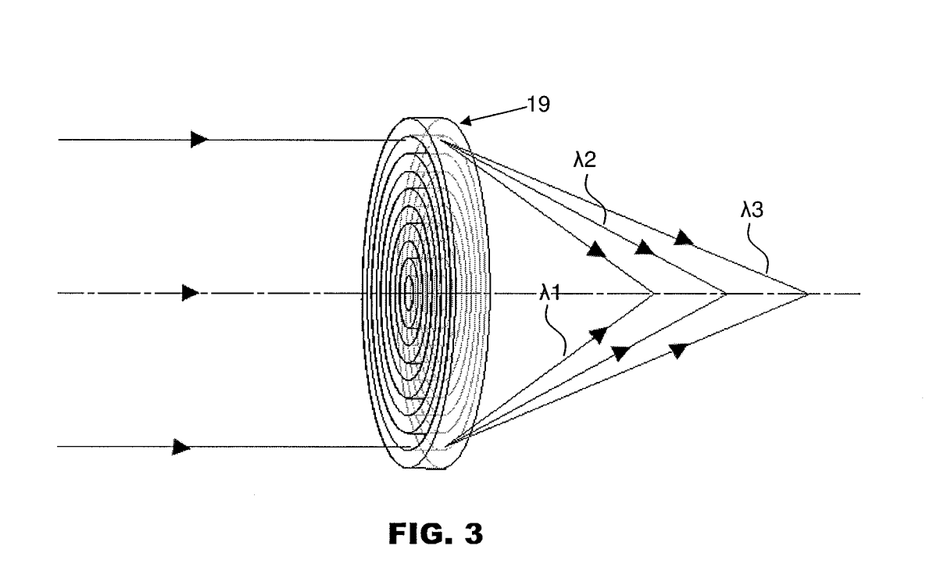
FIG. 3 is a side view of a diffractive lens which may be used with the lens system of FIG. 2.

FIG. 3 is a side view of a diffractive lens 19 which may be used with the lens system of FIG. 2. The diffractive lens 19 is operative to converge the light rays onto different focal planes depending on the wavelengths $\lambda 1, \lambda 2, \lambda 3$ of the light rays. As diffraction is naturally wavelength-dependent, in a chromatic confocal system, its strong chromatic dispersion characteristics are suitable for separating the different wavelengths of light.

Figure 4:
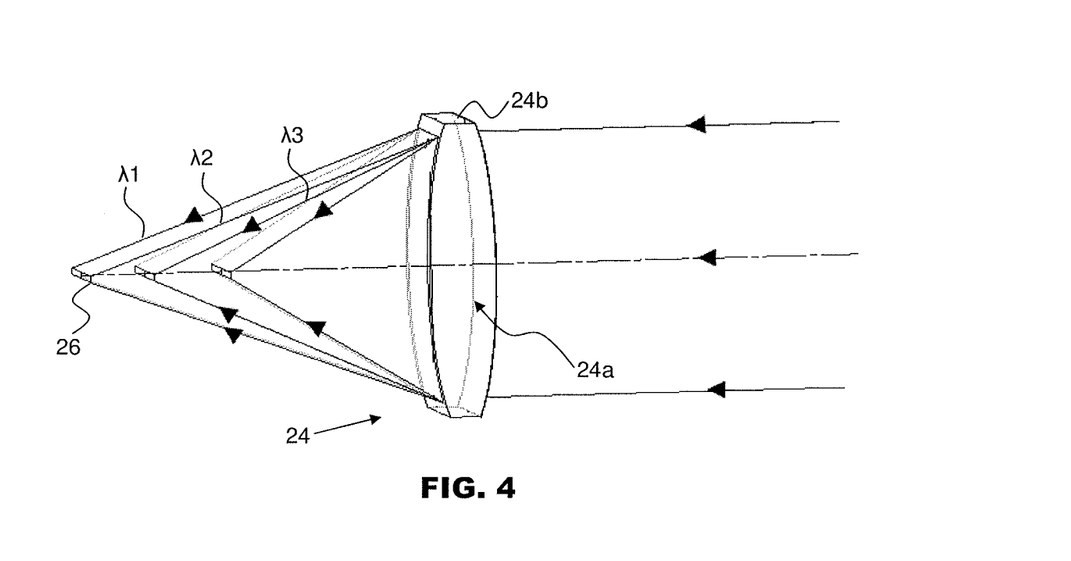
FIG. 4 is a side view of a cylindrical objective lens which may be used with the lens system of FIG. 1.

On the other hand, FIG. 4 is a side view of a cylindrical objective lens 24 which may be used with the lens system 10 of FIG. 1. The cylindrical objective lens 24 has a first side 24a having curved convex edges and a second side 24b that is generally rectangular in shape. The first side 24a is shaped so as to converge light rays onto different focal planes depending on the wavelengths $\lambda 1, \lambda 2, \lambda 3$ of the light rays. The cylindrical objective lens 24 has a uniform cross-section along a cylindrical surface corresponding to the second side 24b of the cylindrical objective lens 24.

Figure 5A:
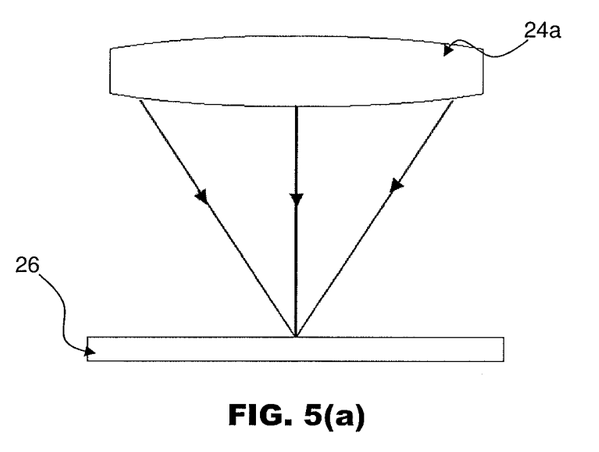
FIG. 5(a) and FIG. 5(b) are respective side views of a chromatic cylindrical objective lens of FIG. 4 when used as a projector as seen from directions which are orthogonal to each other.

FIG. 5(a) is a side view of the chromatic cylindrical objective lens 24 of FIG. 4 when used as a projector as seen from its first side 24a. The convex surfaces of the cylindrical objective lens 24 converge light rays passing through it onto a linear strip of light. Light rays having a certain wavelength are all converged onto a single focal plane that is coplanar with a surface 26 of the object. When light rays with the said wavelength are reflected by the surface 26 and received by the color sensor 34, the height of the surface 26 can be deduced from the colors of such light rays that are received. The inspection conducted using this view has a large projection N.A. but has a very narrow projection depth of field (DOF).

Figure 5B:
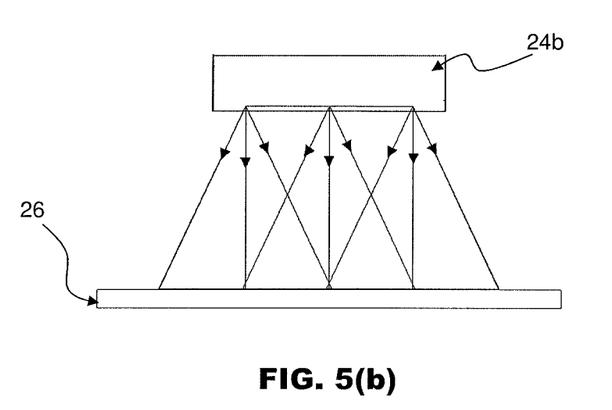

As mentioned above, only a certain wavelength of light that is emitted from the light source 12 comprising a plurality of wavelengths will be converged to the object surface 26, which is then reflected and received by the color sensor 34. To increase lighting energy efficiency, a large lighting N.A. is used. FIG. 5(b) is a side view of the chromatic cylindrical objective lens 24 of FIG. 4 as seen from its second side 24b for illumination lighting. As the cross-section of the objective lens 24 along this view is substantially uniform, the light rays are transmitted onto an elongated strip of the surface 26 of the object. With a large lighting coverage angle, the object surface 26 is illuminated with sufficient lighting energy of a certain wavelength.

Figure 6A:
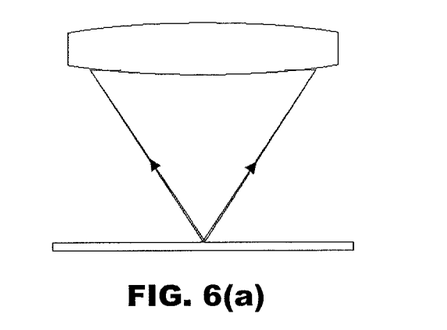
FIGS. 6(a)-6(c) show the asymmetrical N.A. design of the chromatic cylindrical objective lens when used as an imaging part.
Figure 6B:
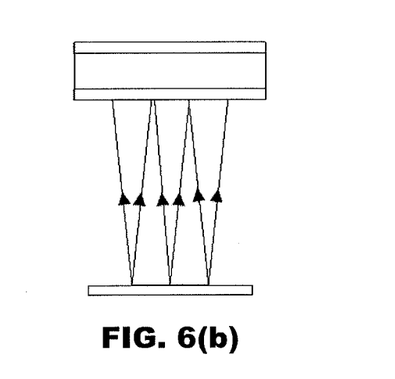
Figure 6C:
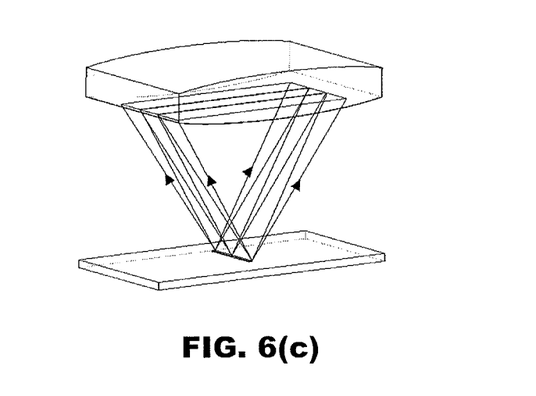

FIGS. 6(a)-6(c) show the asymmetrical N.A. design of the chromatic cylindrical objective lens 24 when used as an imaging part. FIG. 6(a) is a side view of the chromatic cylindrical objective lens 24 of FIG. 4 as seen from its first side 24a for imaging. Light rays having a certain wavelength are reflected from a single focal plane that is coplanar with a surface 26 of the object. When light rays with the said wavelength are reflected by the object surface 26 and received by the color sensor 34, the height of the surface 26 can be deduced from the colors of such light rays that are received. The inspection conducted using this view has a relatively larger N.A. but has a smaller depth of field (DOF).

FIG. 6(b) is a side view of the chromatic cylindrical objective lens 24 of FIG. 4 as seen from its second side 24b for imaging. The inspection conducted using this view has a relatively smaller N.A. but has a larger DOF.

A confocal system estimates a height of a measured point by evaluating the energy reflected from the point. For slit-based confocal apparatus, it is especially important to eliminate the inter-influence of neighboring illumination along the direction of the slit. This is because a lighting intensity of a line of measuring points would be increased simultaneously even at positions which are out of focus.

Figure 7A:
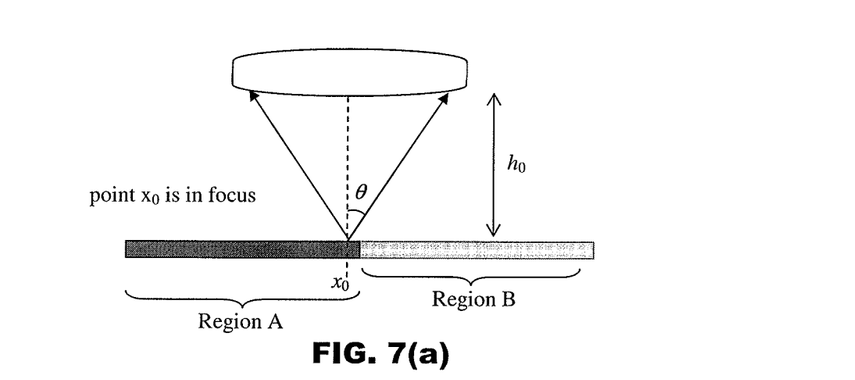
FIGS. 7(a) and 7(b) illustrate how out-of-focus light affects confocal height measurement accuracy especially when reflectivity of an object is not homogenous.
Figure 7B:
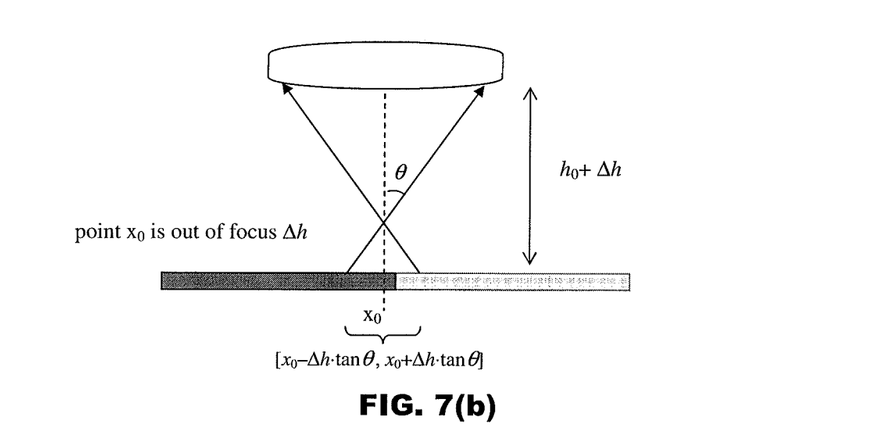

FIGS. 7(a) and 7(b) illustrate how out-of-focus light affects confocal height measurement accuracy especially when reflectivity of an object is not homogenous. For illustration, assume that a point $x_0$ is in a low reflectivity region (A) that is being measured. When $x_0$ is in focus, only a certain amount of energy (E) reflected by $x_0$ is received by the apparatus (see FIG. 7a). However, when $x_0$ is out of focus by $\Delta h$, the system receives total energy E' ranging from position $x_0 - \Delta h \cdot \tan \theta$ to $x_0 + \Delta h \cdot \tan \theta$ (see FIG. 7b), where $\sin \theta$ is the N.A. of the optical system. Sine E' is partially contributed to by some points from region B that are of high reflectivity, such that the resulting value of E' can be larger than that of E. In this case, the system may wrongly interpret that point $x_0$ is more likely to be at a height of $h_0 + \Delta h$ than at $h_0$. In order to eliminate such an undesirable effect, angle $\theta$ (and hence the N.A.) should be minimized. This is the benefit of the concept of applying cylindrical objective lens, in which the N.A. along the slit direction is much smaller than that of circular objective lens.

Figure 8:
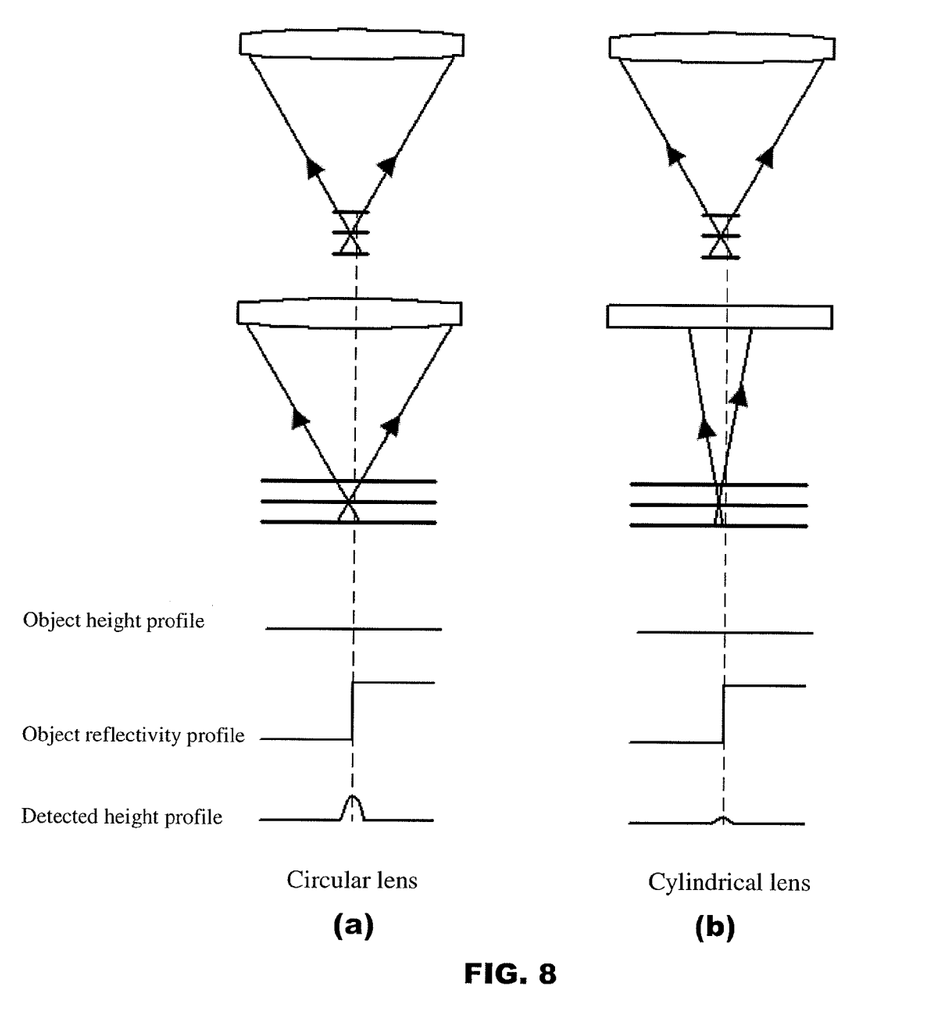
FIG. 8 depicts how an asymmetrical N.A. design attenuates a boundary effect of two regions with different reflectivities.

FIG. 8 depicts how an asymmetrical N.A. design attenuates a boundary effect of two regions with different reflectivities. It depicts two axes of a cylindrical lens, one (a) with a large N.A. (objective side) and the other (b) with a small N.A. The resulting effect caused at the boundary of two regions with different reflectivity is also illustrated. The detected height profile using the cylindrical lens (b) at the boundary on the right (wherein the N.A. is smaller than that of circular lens) becomes more precise.

Figure 9:
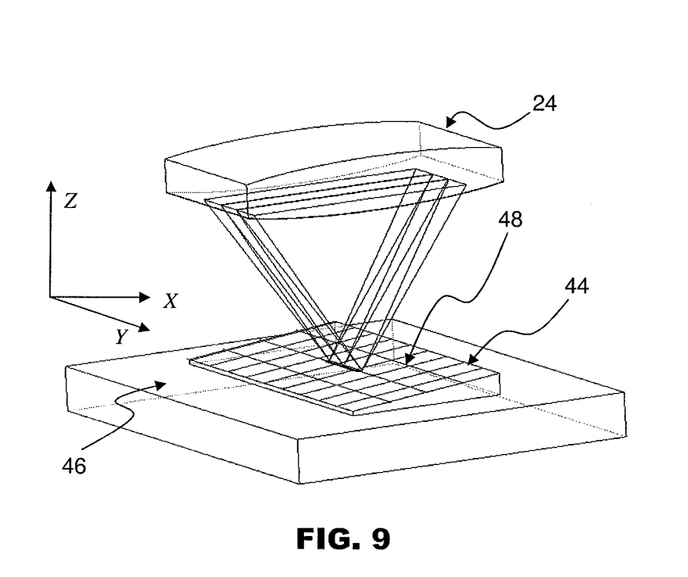
FIG. 9 illustrates a calibration method for the apparatus according to the preferred embodiment of the invention.

FIG. 9 illustrates a calibration method for the apparatus according to the preferred embodiment of the invention. A reference object 44 with a sloping surface is used for calibration for the lens system 10. The reference object 44 is arranged on a movable platform 46 which is operable to shift the reference object linearly relative to the chromatic cylindrical objective lens 24 of the lens system 10.

The reference object 44 has a grid 48 with preset dimensions arranged on a surface of the reference object 44. The grid 48 is used for two-dimensional position calibration and the sloping surface is for mapping between the colors detected by the color sensor 34 relative to known heights of the reference object 44 along its slope. By mapping the colors detected by the color sensor 34 at various grid 48 positions having known heights, the apparatus may be calibrated accordingly.

It should be appreciated that the apparatus according to the preferred embodiment of the invention has a larger field of view as compared to conventional chromatic confocal apparatus which detect a single point or a slit on a surface of an object by using circular objective lens with small field of view and therefore inspection speed is much improved. With the described set-up of the apparatus, the projection achieves better energy utilization as a slit pattern with a large N.A. is projected along one direction of the cylindrical objective lens 24, whereas lighting with a large N.A. is projected along another direction orthogonal to the first direction.

Further, anamophic imaging may be used to suppress out-of-focus light since the image has a large N.A. along one direction of the objective lens, whereas the image is magnified along another direction orthogonal to the first direction such that the image has a smaller N.A. but a larger depth of field.

Moreover, a calibration apparatus and method is provided for non-linear spectral light distribution along different focal lengths for measuring object height efficiently and effectively.

The invention described herein is susceptible to variations, modifications and/or additions other than those specifically described and it is to be understood that the invention includes all such variations, modifications and/or additions which fall within the spirit and scope of the above description.

The invention claimed is:
1. A chromatic confocal scanning apparatus comprising:
  a light source for producing light rays comprising a plurality of wavelengths;
  a first screen having an open elongated slit which allows a strip of light rays produced from the light source to pass through the slit;
  a cylindrical objective lens operative to converge and project the light rays onto an object surface that is to be measured, and to image light rays reflected from the object surface;
  an intermediate cylindrical lens set operative to converge a strip of light rays imaged from the cylindrical objective lens to pass through an open elongated slit comprised in a second screen; and
  a color sensor configured to receive light rays which have passed through the slit of the second screen for determining a plurality of wavelengths of the said strip of light rays for constructing a height profile of at least a portion of the object surface.

2. The chromatic confocal scanning apparatus as claimed in claim 1, wherein the cylindrical objective lens comprises a chromatic cylindrical lens.

3. The chromatic confocal scanning apparatus as claimed in claim 1, further comprising a diffractive lens located between the first screen and the cylindrical objective lens.

4. The chromatic confocal scanning apparatus as claimed in claim 1, wherein the cylindrical objective lens has a pair of convex surfaces for converging light rays passing through the cylindrical objective lens onto a linear strip.

5. The chromatic confocal scanning apparatus as claimed in claim 1, further comprising a beam splitter located between the cylindrical objective lens and the intermediate cylindrical lens set.

6. The chromatic confocal scanning apparatus as claimed in claim 1, wherein the light rays illuminate the portion of the object surface with a strip of light.

7. The chromatic confocal scanning apparatus as claimed in claim 1, wherein the intermediate cylindrical lens set further comprises a first intermediate cylindrical lens and a second intermediate cylindrical lens, and wherein the second intermediate cylindrical lens is arranged to converge the light rays in a direction that is orthogonal to the direction which the first intermediate cylindrical lens converges the light rays.

8. The chromatic confocal scanning apparatus as claimed in claim 7, wherein the first and second intermediate cylindrical lenses both comprise achromatic cylindrical lenses.

9. The chromatic confocal scanning apparatus as claimed in claim 1, further comprising a non-cylindrical objective lens between the second screen and the color sensor.

10. The chromatic confocal scanning apparatus as claimed in claim 1, further comprising a positioning device for moving the object relative to the cylindrical objective lens in order to construct a height profile of multiple portions of the object surface.

11. The chromatic confocal scanning apparatus as claimed in claim 1, wherein an image of the illuminated strip has a first depth of field and first numerical aperture along a length of the illuminated strip and a second depth of field and second numerical aperture along a width of the illuminated strip, wherein the first depth of field is smaller than the second depth of field and the first numerical aperture is larger than the second numerical aperture.

12. The chromatic confocal scanning apparatus as claimed in claim 11, wherein an image received by the color sensor has different numerical apertures along two axes that are orthogonal to each other.

13. The chromatic confocal scanning apparatus as claimed in claim 12, wherein the lower numerical aperture along one of the axes is configured to decrease interference from out-of-focus light detected by the color sensor at a boundary of the image.

14. A device for calibrating the chromatic confocal scanning apparatus as claimed in claim 1, the device comprising a reference object with a sloping surface, the device being adapted to be placed onto a movable platform which is operable to shift the reference object relative to the chromatic confocal scanning apparatus.

15. The device as claimed in claim 14, further comprising a grid with preset dimensions which is arranged on the surface of the reference object.

* * * * *